United States Patent
Geliot

(10) Patent No.: US 11,242,159 B2
(45) Date of Patent: Feb. 8, 2022

(54) AIRCRAFT TURBOMACHINE ASSEMBLY COMPRISING AN ARTICULATED COWL

(71) Applicant: Airbus Operations SAS, Toulouse (FR)

(72) Inventor: Jean Geliot, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 444 days.

(21) Appl. No.: 16/418,555

(22) Filed: May 21, 2019

(65) Prior Publication Data

US 2020/0025088 A1  Jan. 23, 2020

(30) Foreign Application Priority Data

Jun. 5, 2018 (FR) .................................... 1854855

(51) Int. Cl.
*B64D 29/08* (2006.01)
*B64D 29/06* (2006.01)
(Continued)

(52) U.S. Cl.
CPC .............. *B64D 29/08* (2013.01); *B64D 29/06* (2013.01); *B64D 27/10* (2013.01); *F02C 7/20* (2013.01);
(Continued)

(58) Field of Classification Search
CPC ........ B64D 29/08; B64D 29/06; B64D 27/10; F02C 7/20; F05D 2220/323;
(Continued)

(56) References Cited

U.S. PATENT DOCUMENTS 1,136,498 A * 4/1915 Tower ....................... E05B 7/00
  292/36
2,355,542 A * 8/1944 Loftin ...................... E05D 3/14
  16/371
(Continued)

FOREIGN PATENT DOCUMENTS

EP   0188825 A2    7/1986
FR   2901244 A1   11/2007
WO   2015092313 A1  6/2015

OTHER PUBLICATIONS

French Search Report; priority document.

*Primary Examiner* — Gerald L Sung
*Assistant Examiner* — Rene D Ford
(74) *Attorney, Agent, or Firm* — Greer, Burns & Crain, Ltd.

(57) ABSTRACT

A turbomachine assembly for an aircraft comprising a nacelle with a nacelle structure, cowls attached to the structure to create an aerodynamic surface, an articulated cowl, comprising four edges, in the upper portion of the nacelle, an articulation at a first edge of the articulated cowl attached between the articulated cowl and the nacelle structure allowing the articulated cowl to move between a closed and an open position, a locking system at a second edge of the articulated cowl, opposite the first edge. The locking system comprises a handle actuable from the exterior of the nacelle, between a first position and a second position, a locking device movable between a locking position and an unlocking position, and a transmission system that moves the locking device from the locking position to the unlocking position when the handle passes from the first position to the second position, and vice versa.

4 Claims, 3 Drawing Sheets

(51) Int. Cl.
*B64D 27/10* (2006.01)
*F02C 7/20* (2006.01)

(52) U.S. Cl.
CPC .... *F05D 2220/323* (2013.01); *F05D 2240/90* (2013.01)

(58) Field of Classification Search
CPC ............... F05D 2240/90; B64C 1/1446; E05C 9/04–048; E05D 3/14
See application file for complete search history.

(56) References Cited

U.S. PATENT DOCUMENTS

| | | | | |
|---|---|---|---|---|
| 3,051,280 | A * | 8/1962 | Wood | B64C 1/1407 49/249 |
| 4,095,311 | A * | 6/1978 | Janosch | E05D 3/14 16/370 |
| 4,720,065 | A * | 1/1988 | Hamatani | B64C 1/1407 244/129.5 |
| 5,938,248 | A * | 8/1999 | Vickers | E05B 5/00 292/36 |
| 6,220,546 | B1 * | 4/2001 | Klamka | B64D 29/00 244/129.4 |
| 7,469,862 | B2 * | 12/2008 | Layland | B64D 15/12 244/134 D |
| 8,661,667 | B2 * | 3/2014 | Bogue | B64D 29/06 29/889.1 |
| 10,054,079 | B2 * | 8/2018 | Kopecek | F02K 1/766 |
| 10,087,663 | B2 * | 10/2018 | Garcia De La Torre | E05C 1/08 |
| 2004/0000615 | A1 * | 1/2004 | Gonidec | B64D 29/00 244/53 B |
| 2007/0267539 | A1 | 11/2007 | Bulin | |
| 2009/0283631 | A1 * | 11/2009 | Roche | B64D 29/08 244/54 |
| 2016/0031563 | A1 | 2/2016 | Pautis | |
| 2016/0145918 | A1 * | 5/2016 | Liang | B64D 29/08 292/99 |
| 2016/0258196 | A1 * | 9/2016 | Yamamoto | E05D 15/46 |
| 2017/0009599 | A1 * | 1/2017 | Dahmen | F01D 21/14 |
| 2017/0198658 | A1 * | 7/2017 | Higgins | B64D 33/04 |
| 2018/0142624 | A1 * | 5/2018 | Song | B64D 29/06 |
| 2018/0216379 | A1 * | 8/2018 | Spoelstra | E05D 3/14 |
| 2018/0222567 | A1 * | 8/2018 | Lopez Fernandez | B64C 1/1407 |
| 2020/0130811 | A1 * | 4/2020 | Crawford | B64D 29/08 |

* cited by examiner

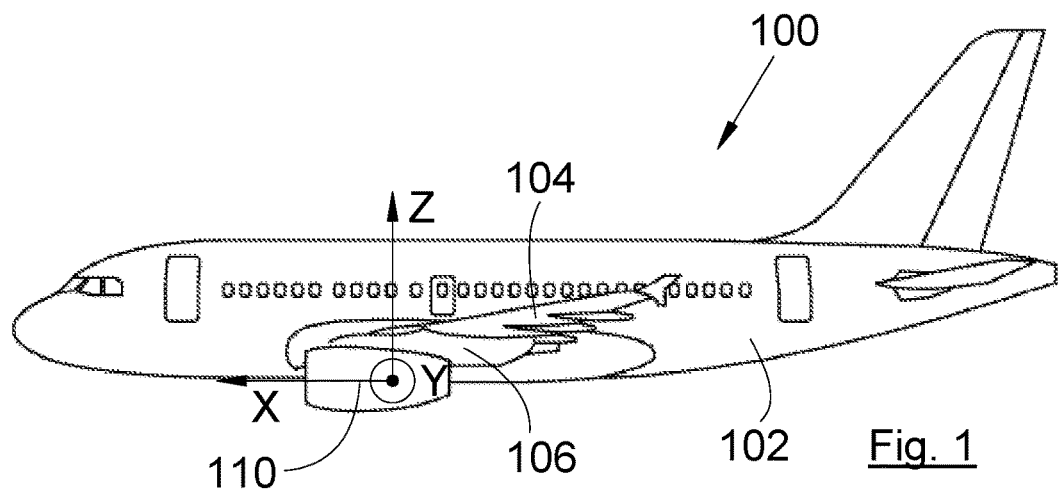
Fig. 1
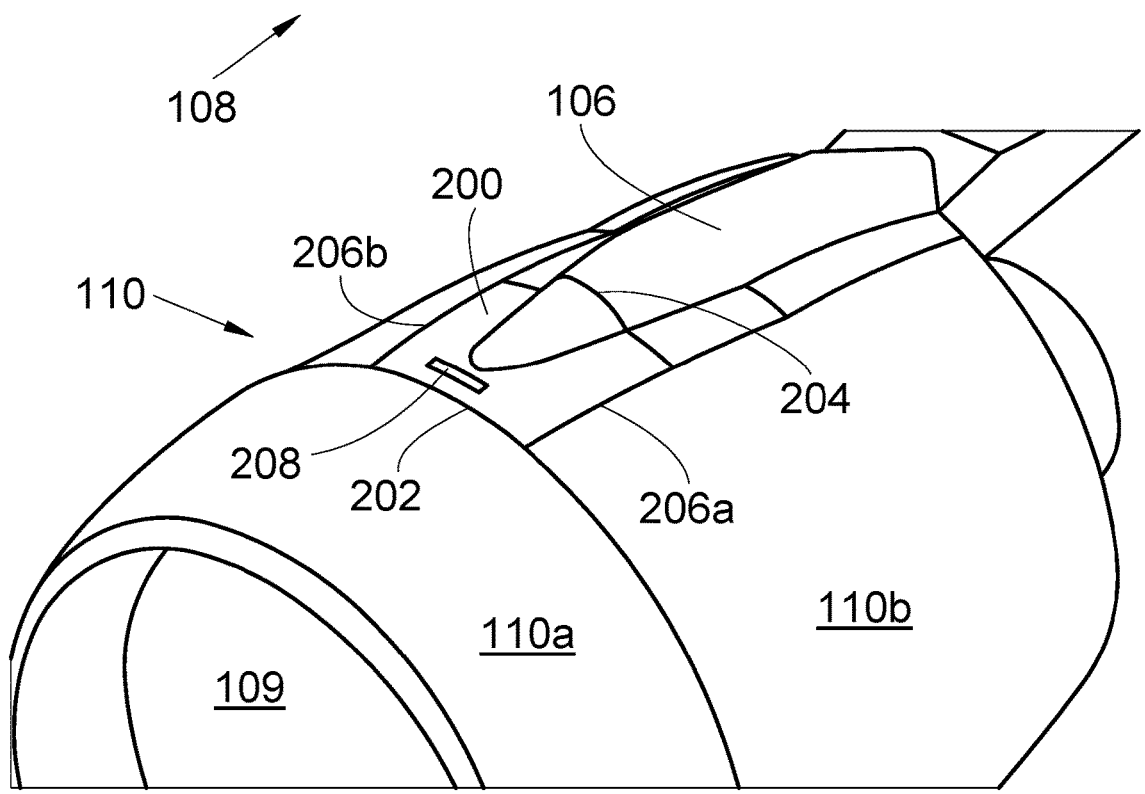
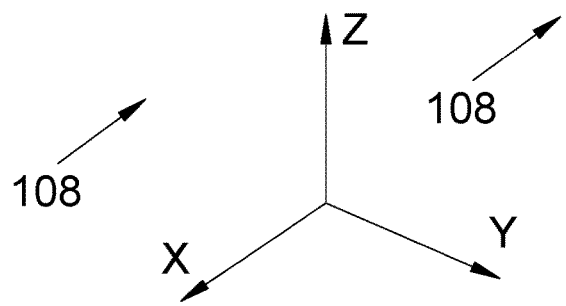
Fig. 2

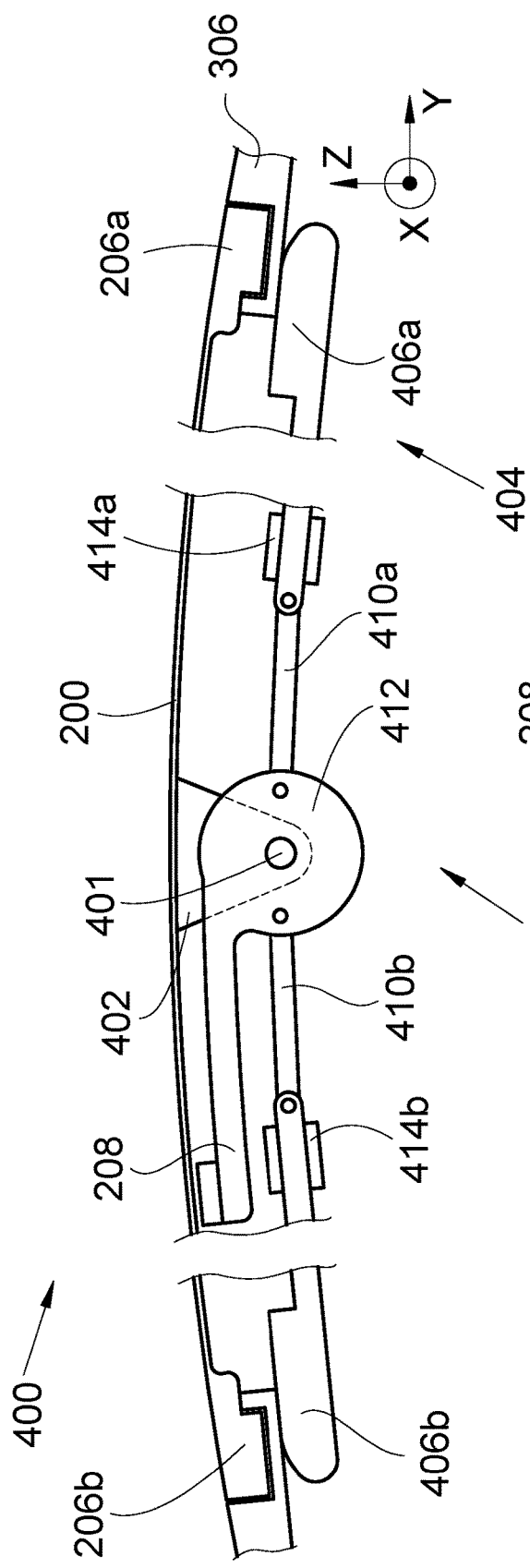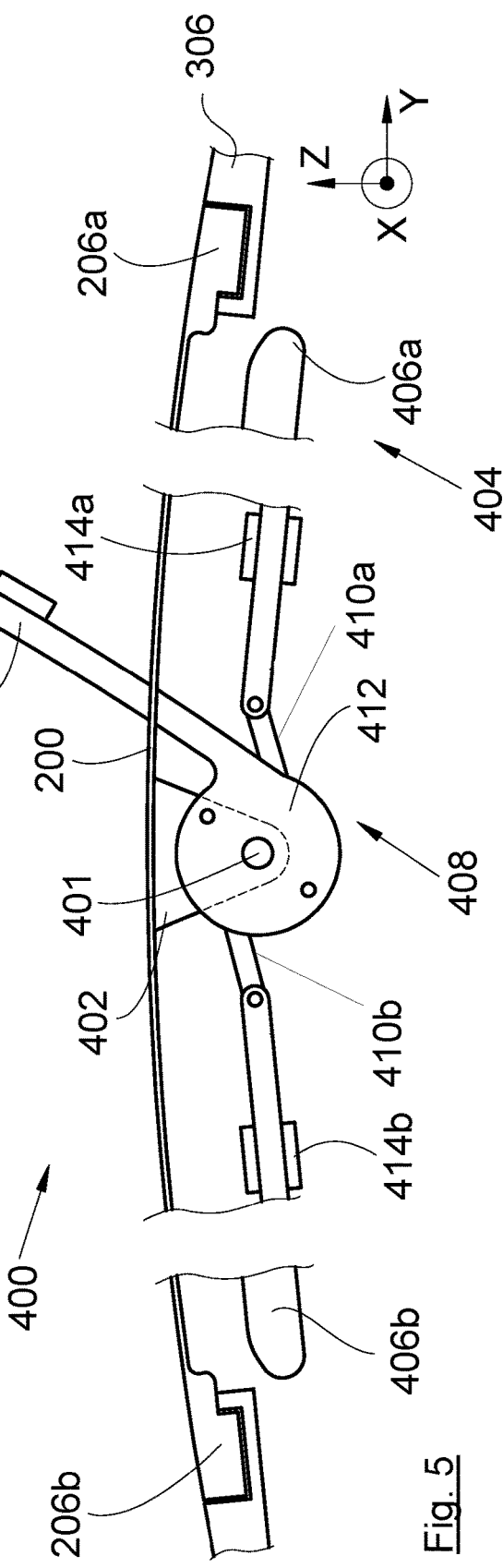

AIRCRAFT TURBOMACHINE ASSEMBLY COMPRISING AN ARTICULATED COWL

CROSS-REFERENCES TO RELATED APPLICATIONS

This application claims the benefit of the French patent application No. 1854855 filed on Jun. 5, 2018, the entire disclosures of which are incorporated herein by way of reference.

FIELD OF THE INVENTION

The present invention relates to a turbomachine assembly for an aircraft comprising an articulated cowl, and to an aircraft comprising such an assembly.

BACKGROUND OF THE INVENTION

An aircraft conventionally comprises a fuselage, on either side of which is attached a wing. Each wing supports at least one mounting pylon which in turn supports a turbomachine assembly consisting of a nacelle and an engine. The nacelle forms the aerodynamic surface that surrounds the engine.

The mounting pylon is attached between the wing structure and the turbomachine assembly.

Numerous systems, for example electric and hydraulic systems, are located at the junction between the mounting pylon and the turbomachine assembly. These systems are covered by aerodynamic cowls, such as some of those which make up the nacelle.

In particular, a cowl located in the upper portion of the nacelle may be removed in order to gain access to the above-mentioned systems, and, in particular, to the electrical connections between the mounting pylon and the engine.

Currently, a cowl of this kind is secured by means of multiple securing screws, and during maintenance periods the removal and re-installation of the cowl are lengthy.

SUMMARY OF THE INVENTION

One object of the present invention is to propose a nacelle which comprises an articulated cowl that facilitates access to the systems located at the junction between the mounting pylon and the engine.

To that end, the present document proposes a turbomachine assembly for an aircraft comprising a nacelle, the nacelle comprising:
 a structure,
 cowls attached to the structure so as to create an aerodynamic surface,
 an articulated cowl which comprises four edges, and is located in the upper portion of the nacelle,
 an articulation located at a first edge of the articulated cowl, and attached between the articulated cowl and the structure of the nacelle, the articulation allowing the articulated cowl to move between a closed position, in which the articulated cowl is aerodynamically continuous with the other cowls, and an open position, in which the articulated cowl frees an opening in the nacelle,
 a locking system located at a second edge of the articulated cowl, opposite the first edge, the locking system comprising:
 a handle that is actuable, from the exterior of the nacelle, between a first position and a second position,
 a locking device that is able to move between a locking position, in which it prevents the second edge from moving with respect to the structure of the nacelle, and an unlocking position, in which it allows the second edge to move with respect to the structure of the nacelle, and
 a transmission system configured to move the locking device from the locking position to the unlocking position when the handle passes from the first position to the second position, and vice versa.

A nacelle of this type thus facilitates the work of the technicians since the articulated cowl can be opened and closed quickly and easily.

Advantageously, the articulation comprises two deformable quadrilaterals that are in parallel planes, each deformable quadrilateral comprises a first shoe attached to the structure of the nacelle and a second shoe attached to a structural element of the articulated cowl, and each deformable quadrilateral also comprises two bars, where one end of each bar is mounted in articulated fashion on the first shoe and where the other end of each bar is mounted in articulated fashion on the second shoe.

Advantageously, the third and fourth edges come to bear against the structure of the nacelle in the closed position, the handle is mounted so as to be able to move in rotation, on the articulated cowl, about an axis of rotation, the locking device comprises, for each of the third and fourth edges, a tab that is mounted so as to be able to move in translation, on the articulated cowl, between the locking position, in which the tab is positioned below the structure supporting the edge, and the unlocking position in which the tab is moved closer to the axis of rotation so as to disengage from the structure, and the transmission system comprises a plate which is as one with the handle and, for each tab, a connecting rod of which one end is mounted in articulated fashion on the plate and of which the other end is mounted in articulated fashion on the tab.

The invention also proposes an aircraft comprising a mounting pylon and a turbomachine assembly according to one of the preceding variants, mounted on the mounting pylon, in which the nacelle comprises an air intake and in which the articulated cowl is located between the air intake and the mounting pylon.

BRIEF DESCRIPTION OF THE DRAWINGS

The features of the invention mentioned above, along with others, will become more clearly apparent on reading the following description of one exemplary embodiment, the description being given with reference to the appended drawings, in which:

FIG. 1 shows a side view of an aircraft according to the invention,

FIG. 2 is a perspective view of a turbomachine assembly according to the invention, FIG. 4 is a front view of a locking system in the locked position, FIG. 5 is a front view of the locking system in the unlocked position.

DETAILED DESCRIPTION OF THE PREFERRED EMBODIMENTS

Figure 3:
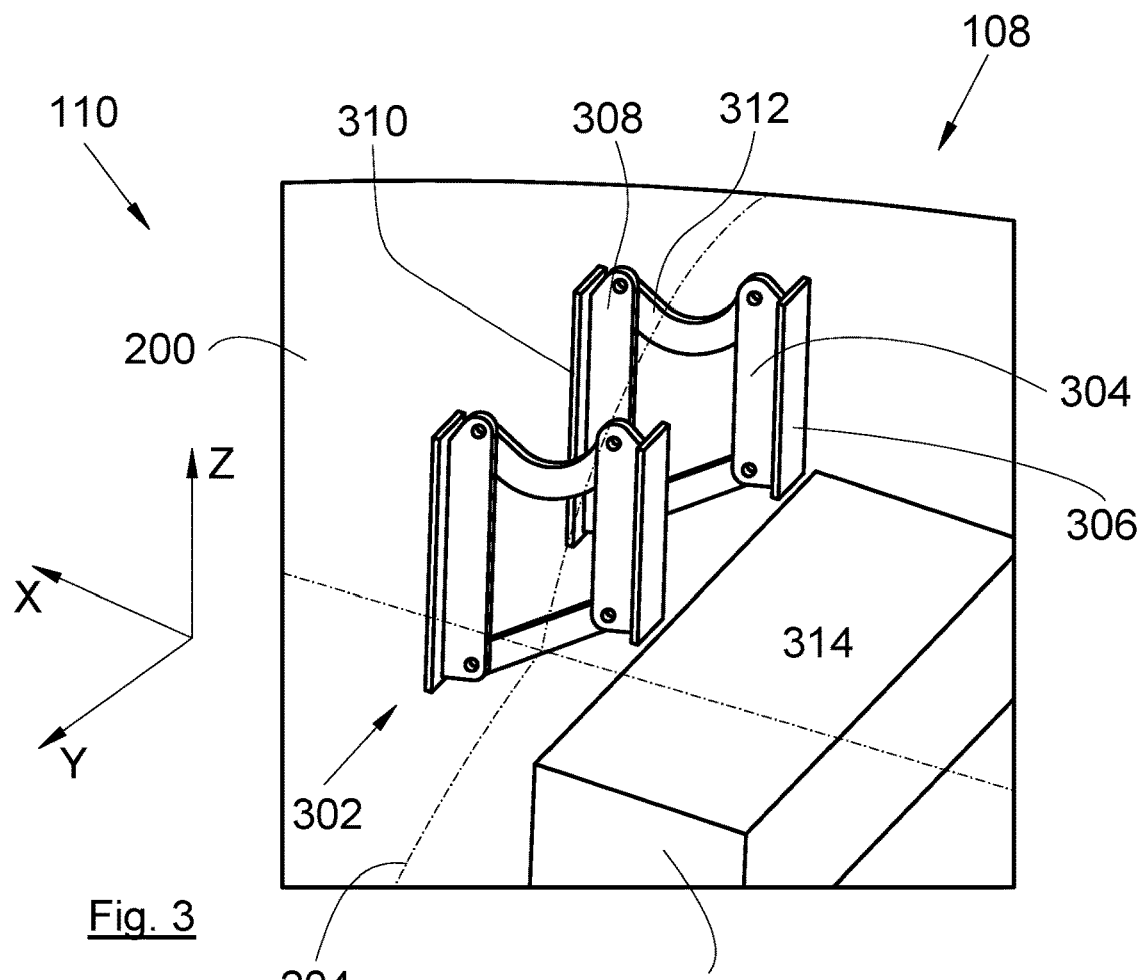
FIG. 3 is a perspective view of an exemplary articulation for an articulated cowl.

FIG. 1 shows an aircraft 100 which comprises a fuselage 102, on either side of which is attached a wing 104. Below each wing 104 is attached a mounting pylon 106, to which is mounted a turbomachine assembly 108 comprising a nacelle 110 and an engine (not shown) that is surrounded by the nacelle 110.

In the description that follows, and as is conventional, the X axis is the longitudinal axis of the nacelle 110, with positive orientation in the direction of advance of the aircraft 100, this being also parallel to the longitudinal axis of the aircraft 100; the Y axis is the transverse axis of the nacelle 110 and is horizontal when the aircraft 100 is on the ground; the Z axis is the vertical axis or vertical height when the aircraft 100 is on the ground; these three directions X, Y and Z are mutually orthogonal and form an orthogonal reference system.

FIG. 2 shows the junction between the turbomachine assembly 108 and the mounting pylon 106. The nacelle 110 comprises a structure and multiple cowls (or fairings) 110a-b, 200 which are attached to the structure so as to create an aerodynamic surface. As is known, the nacelle comprises an air intake 109 through which the engine takes in the air that it requires for operation. The nacelle 110 comprises, in particular, in the upper portion and in front of the mounting pylon 106 (that is to say, between the air intake 109 and the pylon 106), an articulated cowl 200.

The articulated cowl 200 comprises four edges 202, 204 and 206a-b, in mutually opposite pairs.

More particularly, the articulated cowl 200 has a front edge 202 which is located at the front of the articulated cowl 200 in terms of the longitudinal axis X, and which is generally parallel to the transverse axis Y.

More particularly, the articulated cowl 200 has a rear edge 204 which is located at the rear of the articulated cowl 200 in terms of the longitudinal axis X, and which is also generally parallel to the transverse axis Y.

More particularly, the articulated cowl 200 has two lateral edges 206a-b which are located on the port and starboard sides of the articulated cowl 200 and are generally parallel to the longitudinal axis X.

The articulated cowl 200 is mounted in articulated fashion on the structure of the nacelle 110, between a closed position (FIG. 2), in which the articulated cowl 200 is aerodynamically continuous with the other cowls 110a-b of the nacelle 110, and an open position, in which the articulated cowl 200 frees an opening in the nacelle 110 so as to permit access to the interior of the nacelle 110 and, in particular, to the systems of the aircraft 100 that extend between the mounting pylon 106 and the engine.

The nacelle 110 comprises an articulation that is located at a first edge 202, 204, 206a-b of the articulated cowl 200, and a locking system that is located at a second edge 204, 202, 206b-a of the articulated cowl 200, on the opposite side from the first edge.

The articulation 300 is attached between the articulated cowl 200 and the structure of the nacelle 110, and allows the articulated cowl 200 to move from the closed position to the open position and vice versa.

The locking system comprises a handle 208 that can be actuated from the exterior of the nacelle 110 by a technician, between a first position and a second position.

The locking system also comprises a locking device that is able to move between a locking position, in which it prevents the second edge from moving with respect to the structure of the nacelle 110, and an unlocking position, in which it allows the second edge to move with respect to the structure of the nacelle 110.

The locking system also comprises a transmission system which moves the locking device from the locking position to the unlocking position when the handle 208 passes from the first position to the second position, and vice versa.

Thus, an articulated cowl 200 of this kind permits quick and easy access to the interior of the nacelle 110.

Figure 6:
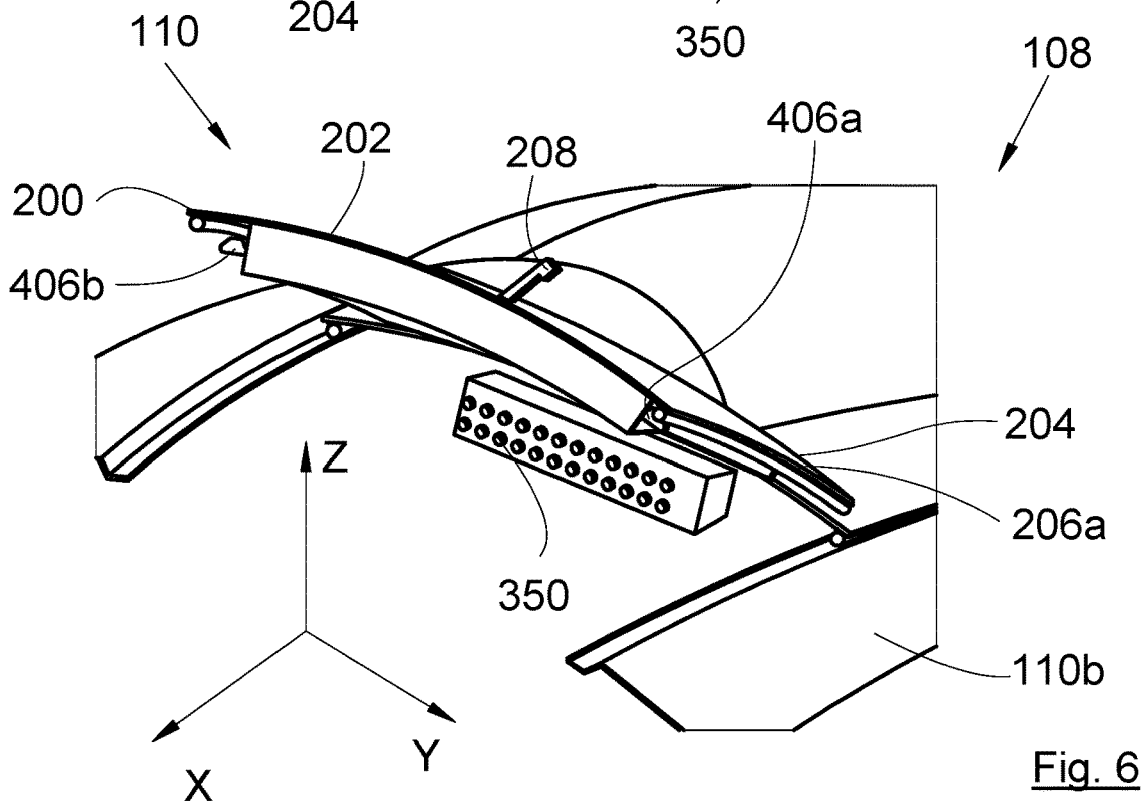
FIG. 6 is a perspective view of the assembly according to the invention in an open position.

FIG. 3 shows an articulation 300 according to one particular embodiment of the invention, in which figure the articulated cowl 200 and the nacelle 110 are transparent. FIG. 6 shows the turbomachine assembly 108 in the open position.

In the embodiment of the invention, the articulation 300 is located at the rear edge 204, but in another embodiment, it could be attached at another edge 202, 206a-b. That is to say that, in this instance, the first edge is the rear edge 204, and the second edge is the front edge 202.

The articulation 300 comprises two deformable quadrilaterals 302 which are in planes that are mutually parallel and perpendicular to the first edge, and more particularly in this instance the parallel planes are parallel to the XZ plane.

Each deformable quadrilateral 302 comprises a first shoe 304 attached to the structure 306 of the nacelle 110 and a second shoe 308 attached to a structural element 310 of the articulated cowl 200, close to the first edge.

Each deformable quadrilateral 302 also comprises two bars 312 and 314, where one end of each bar 312, 314 is mounted in articulated fashion on the first shoe 304 and where the other end of each bar 312, 314 is mounted in articulated fashion on the second shoe 308.

An articulation 300 of this kind allows the articulated cowl 200 to be opened wide in order to gain access to the systems of the aircraft 100 such as, in particular, an electrical box 350.

FIG. 4 and FIG. 5 show an embodiment of the locking system 400. The articulated cowl 200 comes to bear against the structure 306 of the nacelle 110 when it is in the closed position, in particular, each of the lateral edges 206a-b comes to bear against the structure 306. In general terms, in the closed position the third and fourth edges, that is to say, those which are not the first edge or the second edge, come to bear against the structure 306 of the nacelle 110. In this instance, the third and fourth edges are the lateral edges 206a-b.

The handle 208 is mounted so as to be able to move in rotation, on the articulated cowl 200, about an axis of rotation 401 parallel to the other edges and in this instance parallel to the longitudinal axis X, on a bearing 402 that is as one with the articulated cowl 200 and is located below the latter inside the nacelle 110.

The locking device 404 comprises, for each of the third and fourth edges, in this instance each lateral edge 206a-b, a tab 406a-b that is mounted so as to be able to move, on the articulated cowl 200, between the locking position (FIG. 4), in which the tab 406a-b is positioned below the structure 306 supporting the edge 206a-b, and the unlocking position (FIG. 5), in which the tab 406a-b is moved closer to the axis of rotation 401 so as to disengage from the structure 306. Each tab 406a-b is mounted so as to be able to slide in at least one guide 414a-b that is as one with the articulated cowl 200 and allows the tab 406a-b to move. In the locking position, each tab 406a-b is remote from the axis of rotation 401. The movement of each tab 406a-b is, in this instance, generally a rotation about the longitudinal axis X.

The transmission system 408 comprises a plate 412 which is as one with the handle 208 and, for each tab 406a-b, a connecting rod 410a-b of which one end is mounted in articulated fashion on the plate 412 and of which the other end is mounted in articulated fashion on the tab 406a-b.

As shown in FIGS. 4 and 5, the rotation of the handle 208 about the axis of rotation 401 drives the movement of the connecting rods 410a-b and of the tabs 406a-b in one direction or in the other.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbomachine assembly for an aircraft comprising a nacelle having a longitudinal axis, said nacelle comprising:
   a nacelle structures;
   cowls attached to said structure to create an aerodynamic surface;
   an articulated cowl comprising four edges and being located in an upper portion of the nacelle, the articulated cowl having a front edge located at a front of the articulated cowl in terms of the longitudinal axis of the nacelle and a rear edge located at a rear of the articulated cowl in terms of the longitudinal axis;
   an articulation located at the rear edge of the articulated cowl and attached between the articulated cowl and the nacelle structure, said articulation allowing the articulated cowl to move between a closed position, in which the articulated cowl is aerodynamically continuous with the cowls, and an open position, in which the articulated cowl frees an opening in the nacelle; and
   a locking system located at the front edge of the articulated cowl, the locking system comprising:
      a handle actuated from an exterior of the nacelle between a first position and a second position,
      a locking device able to move between a locking position in which the locking device prevents the front edge from moving with respect to the structure of the nacelle and an unlocking position in which the locking device allows the front edge to move with respect to the nacelle structure, and
      a transmission system configured to move the locking device from the locking position to the unlocking position when the handle passes from the first position to the second position, and vice versa.

2. The turbomachine assembly according to claim 1, wherein the articulation comprises two deformable quadrilaterals that are in parallel planes,
   wherein each deformable quadrilateral comprises a first shoe attached to the nacelle structure and a second shoe attached to a structural element of the articulated cowl, and
   wherein each deformable quadrilateral also comprises two bars, one end of each bar being mounted in articulated fashion on the first shoe and an opposite end of each bar being mounted in articulated fashion on the second shoe.

3. The turbomachine assembly according to claim 1,
   wherein a third and a fourth of the edges of the nacelle bear against the nacelle structure in the closed position,
   wherein the handle is mounted so as to be able to move in rotation on the articulated cowl about an axis of rotation,
   wherein the locking device comprises, for each of the third and fourth edges, a tab movably mounted on the articulated cowl, the tab movable between the locking position in which the tab is positioned below the nacelle structure supporting said third and fourth edges and the unlocking position in which the tab is moved closer to the axis of rotation so as to disengage from the supporting nacelle structure,
   wherein the transmission system comprises a plate which is fixed to the handle, and
   wherein for each tab there is a connecting rod, one end of the connecting rod is mounted in articulated fashion on the plate and an opposite end of the connecting rod is mounted in articulated fashion on the tab.

4. An aircraft comprising a mounting pylon and a turbomachine assembly according to claim 1 mounted on said mounting pylon, wherein the nacelle comprises an air intake and wherein the articulated cowl is located between the air intake and the mounting pylon.

* * * * *